United States Patent
Glas et al.

(10) Patent No.: US 7,630,862 B2
(45) Date of Patent: Dec. 8, 2009

(54) LOAD TEST SIMULATOR

(75) Inventors: Edward D. Glas, Raleigh, NC (US); Brian D. Harry, Chapel Hill, NC (US)

(73) Assignee: Microsoft Corporation, Redmond, WA (US)

( * ) Notice: Subject to any disclaimer, the term of this patent is extended or adjusted under 35 U.S.C. 154(b) by 899 days.

(21) Appl. No.: 10/810,944

(22) Filed: Mar. 26, 2004

(65) Prior Publication Data

US 2005/0216234 A1 Sep. 29, 2005

(51) Int. Cl.
G06F 11/30 (2006.01)
G06F 11/00 (2006.01)

(52) U.S. Cl. .................... 702/186; 702/119; 702/120; 702/188; 709/224

(58) Field of Classification Search ......... 702/181–190, 702/119–123; 709/220–224, 203, 204
See application file for complete search history.

(56) References Cited

U.S. PATENT DOCUMENTS

| | | | | |
|---|---|---|---|---|
| 5,812,780 A * | 9/1998 | Chen et al. | ................... | 709/224 |
| 5,974,572 A * | 10/1999 | Weinberg et al. | ............. | 714/47 |
| 6,324,492 B1 * | 11/2001 | Rowe | .......................... | 703/13 |
| 6,418,544 B1 | 7/2002 | Nesbitt et al. | | |
| 6,477,483 B1 * | 11/2002 | Scarlat et al. | ............... | 702/186 |
| 6,542,854 B2 * | 4/2003 | Yang et al. | .................. | 702/186 |
| 6,560,564 B2 * | 5/2003 | Scarlat et al. | ............... | 702/186 |
| 6,654,699 B2 * | 11/2003 | Millard | ....................... | 702/108 |
| 6,694,288 B2 * | 2/2004 | Smocha et al. | .............. | 702/186 |
| 6,721,686 B2 * | 4/2004 | Malmskog et al. | .......... | 702/186 |
| 6,735,719 B2 | 5/2004 | Moe et al. | | |
| 6,823,380 B1 * | 11/2004 | Nace et al. | .................. | 709/224 |
| 6,898,556 B2 * | 5/2005 | Smocha et al. | ............. | 702/186 |
| 6,898,564 B1 * | 5/2005 | Odhner et al. | ................ | 703/21 |
| 2002/0087714 A1 * | 7/2002 | Connor | ....................... | 709/235 |
| 2002/0099818 A1 * | 7/2002 | Russell et al. | ............... | 709/224 |
| 2002/0138226 A1 * | 9/2002 | Doane | ........................ | 702/119 |
| 2003/0120463 A1 | 6/2003 | Cox et al. | | |
| 2003/0191795 A1 * | 10/2003 | Bernardin et al. | ........... | 709/105 |
| 2003/0221000 A1 * | 11/2003 | Cherkasova et al. | ......... | 709/224 |
| 2004/0003068 A1 | 1/2004 | Boldman et al. | | |

OTHER PUBLICATIONS

Chris Sadler, et al., Applying Predication to Efficiently Handle Runtime Class Testing, ACM Sigarch Computer Architecture News, 2000, pp. 34-42, vol. 28-Issue 1.
David Mosberger, et al., httperf-A Tool for Measuring Web Server Performance, ACM Sigmetrics Performance Evaluation Review, 1998, pp. 31-37, vol. 26-Issue 3.

* cited by examiner

Primary Examiner—Eliseo Ramos Feliciano
Assistant Examiner—Phuong Huynh
(74) Attorney, Agent, or Firm—Workman Nydegger

(57) ABSTRACT

Systems and methodologies are provided for load testing a server wherein user characteristics are adjusted dynamically during the testing period of the server, based upon weightings defined in a user profile. Such dynamic adjustment enables a distribution of user characteristics as a percentage of total requests, (e.g. a per iteration model). The user characteristics can include type of user activities on a web page (e.g. search, browse, check out), browser features (e.g. browser type, browser version) net work connections, various client/server hard ware/software configurations and the like.

11 Claims, 9 Drawing Sheets

LOAD TEST SIMULATOR

TECHNICAL FIELD

The present invention relates generally to server testing, and more particularly to systems and methods that facilitate server load tests by dynamically adjusting simulated user characteristics during a test period, and employing a per iteration model for server loading.

BACKGROUND OF THE INVENTION

Increasing advances in computer technology (e.g., microprocessor speed, memory capacity, data transfer bandwidth, software functionality, and the like) have generally contributed to increased computer application in various industries. At the same time, with the rise of Internet and other related technologies, system requirements for servicing ever increasing network traffic have dramatically changed. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well.

As such, the task of managing web site content and maintaining server effectiveness has generally become increasingly difficult. With millions of users visiting a growing number of sites each day, the computer systems that form the web sites are being asked to serve more and more clients. Web site administrators are continually evaluating their systems to improve performance and efficiency in better servicing their clients. Such evaluations help the administrators learn whether the server software is running properly, whether more or less resources are needed to properly service the demand, and so forth.

In addition, company webmasters and system administrators are routinely faced with a wide array of burdensome tasks, including, for example, the identification and repair of large numbers of broken links (i.e., links to missing URLs), the monitoring and organization of large volumes of diverse, continuously-changing web site content, and the detection and management of congested links. These problems are particularly troublesome for companies that rely on their respective web sites to provide mission-critical information and services to customers and business partners. Generally, performance measurement systems are routinely employed for testing components of such websites and servers.

Typically, many performance measurement systems rely on a connection model in order to determine whether a server can have the requisite capacity to service a desired network load. According to the connection model, a plurality of client systems can be configured to generate a large number of concurrent connections.

Nonetheless, simulating a diverse mix of user population during test loading of a server can be a challenging task. Typically, to attempt a proper simulation for such diverse loading, initially a plurality of permutations for the various user profiles have to be predefined. Such settings can allocate a predetermined user profile upfront for loading a server. Accordingly, at any given time during test loading of the server, a fixed number of simulated users are running a predetermined profile, while another fixed number of users are running according to another predetermined profile, and the like. Yet, such rigid set up based on an upfront determination of various permutations (e.g. a predetermined number of users with particular type of internet connection or web browsers, or particular connection paths to the server, and the like) can create cumbersome operations, as well as a waste of system resources. Moreover, as number of characteristics assigned to a user profile increases, number of resulting permutations required to simulate such characteristics can increase exponentially. Generally, this can significantly hinder setting a test load that accurately simulates diverse population of users accessing a server and its associated applications.

Therefore, there is a need to overcome the aforementioned deficiencies associated with conventional systems and methodologies related to server testing.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for systems and methods of load testing a server, wherein user characteristics can be adjusted dynamically during a testing period of the server, based upon weightings defined in a user profile. Such dynamic adjustment enables a distribution of simulated user characteristics as a percentage of total requests, (e.g. a per iteration model), as opposed to as a percentage of total users (e.g. thread per user model). The user characteristics can include type of user activities on a web page (e.g. search, browse, check out), browser characteristics (e.g. browser type, browser version) network connections, various client/server hardware/software configurations and the like.

In accordance with an aspect of the present invention, a single user profile with weightings assigned to various characteristics can be specified. At any given time during the load test, a predetermined number of concurrent simulated users can run according to various settings of such user profile. As a simulated user completes an iteration (e.g. enters and leaves a website of a server), a new simulated user can be introduced to the server, and be randomly assigned user characteristics according to the weightings specified in the profile. Accordingly, diverse simulated user populations can be obtained that are dynamically adjusted based on the weightings assigned in the user profile.

According to another aspect of the present invention a load coordinator can evaluate a current distribution of simulated users relative to a desired test load and adjust the intensity of the load test (e.g. number of simulated users directed to the server per unit of time) as well as the distribution of the simulated users. In addition, various scenarios of load testing can be designed and implemented via an artificial intelligence unit. Such scenarios can include a plurality of test mixes, load profiles and user profiles that are statistically determined based on records of web logs. Moreover, scenarios can be designed when a relation can exists among various characteristics defined in the user profile e.g. a users of a pocket PC typically accesses the web sites via a 36K modem.

In a related aspect of the present invention behavior of a user can also be simulated by employing a "think time", which typically imitates a wait period between actions of a user accessing a web page on a web server. Such a think time can be predetermined and chosen based on statistical analysis of web log records.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
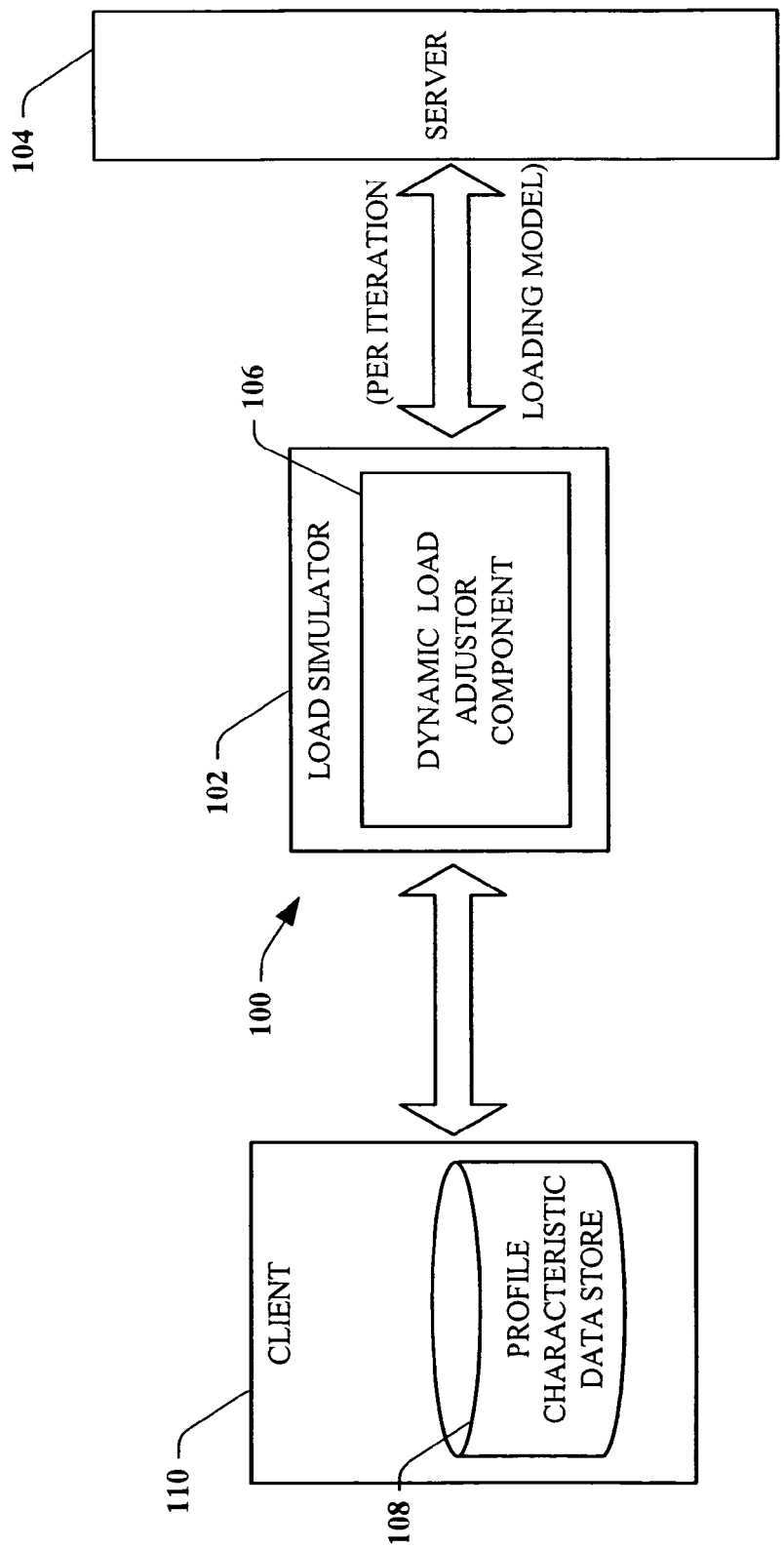
FIG. 1 is a block diagram of a load simulator system that dynamically adjusts user characteristics for stressing a server in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). In addition, as used in this application the term "user" can also refer to a simulated user generated by a load simulator in accordance with the present invention.

The present invention provides for systems and methods of load testing a server, wherein user characteristics can be adjusted dynamically during the testing period of the server according to a per iteration loading model. Referring initially to FIG. 1, a system 100 is illustrated that stresses a server 104 in accordance with an aspect of the present invention. The server 104 is desired to be tested for performance and integrity of an application in terms of both data delivered from server to user and vice versa. The server 104 can maintain various data bases (not shown) to which data to users are to be retrieved in an accurate manner or updated in response to user interaction with web applications. Users can connect to the server 104 via interface communication networks such as local-area networks (LAN) and wide-area networks (WAN). Such LAN technologies can include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). The requests form users to query the server 104 can be of HTTP data format and it is to be appreciated that other well-known request data formats can also be selected.

The system 100 includes load simulator 102 with a dynamic load adjustor component 106 that can be supplied with data from a profile characteristics data store 108. It is to be appreciated that a plurality of simulators acting in concert to load test a server 104 can be provided, even though FIG. 1 depicts only one such simulator 102. Thus, the characteristic data store 108 can be stored on a client machine 110, and supply data to each of a plurality of load simulators 102 during a load test of server 104. The profile characteristic data store 108 can further supply the load adjustor component 106 of the load simulator 102 with weighted user characteristics, which can be inputted by test administrators. Such dynamic load adjustor component 106 can provide a distribution of user characteristics as a percentage of total requests, (e.g. a per iteration model) as compared to conventional systems that employ a distribution as a percentage of total users (e.g. thread per user model.) Accordingly, the dynamic load adjustor component 106 can simulate to the server 104 various type of users, which can be dynamically adjusted during the test run. Such dynamic adjustment typically facilitates load testing procedures, as compared to conventional systems, wherein various users' profiles are defined upfront based on for example permutations of user characteristics, and threads assigned for such permutations.

Figure 2:
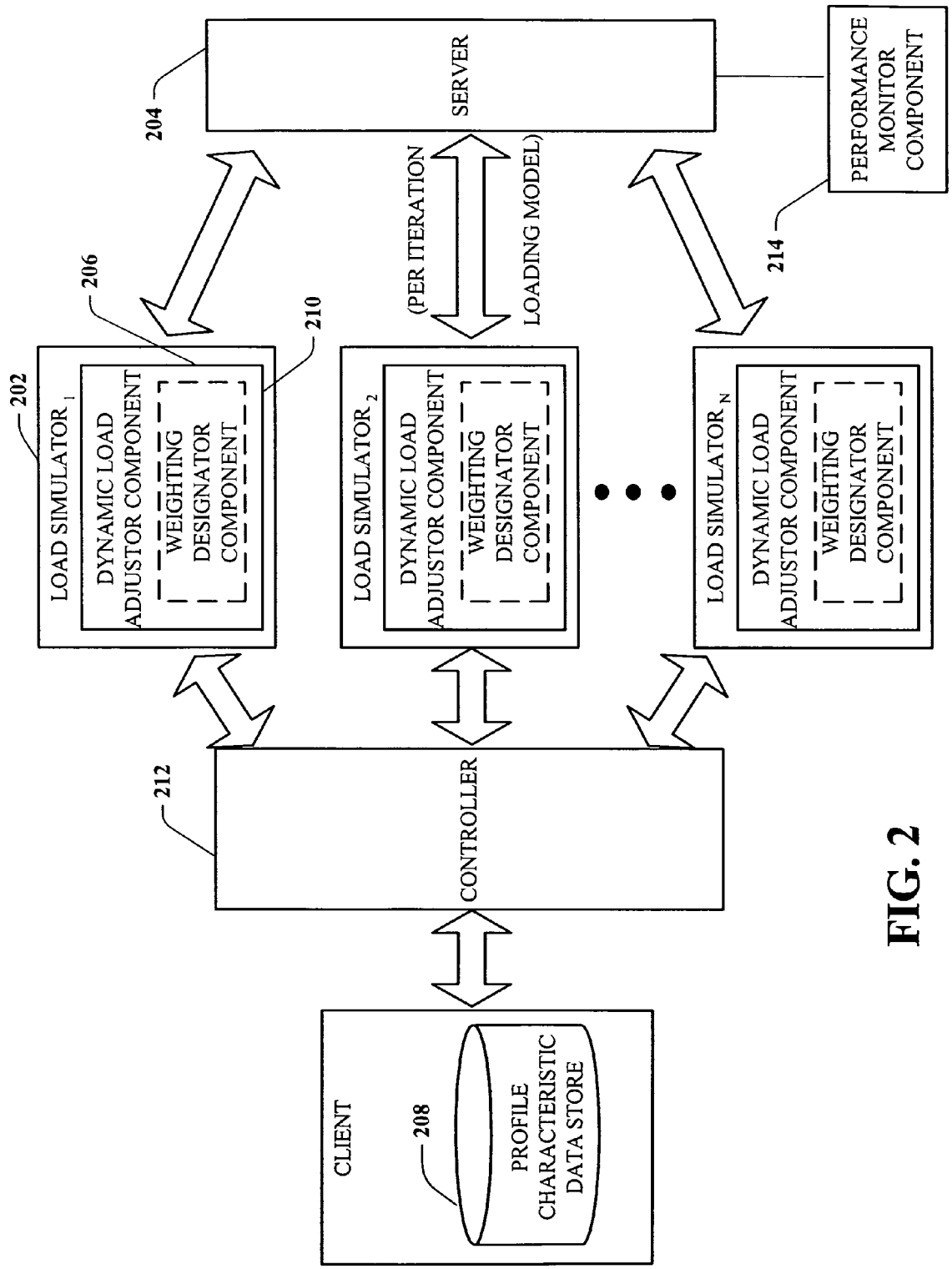
FIG. 2 is another block diagram of a load simulator system with a weighting designator and a controller for stressing a server in accordance with an aspect of the present invention.

FIG. 2 is another block diagram of a load simulator system that employs a plurality of simulators 1 thru N (N being an integer) with each simulator 202 including a weighting designator component 210 as part of its dynamic load adjustor component 206 for stressing a server 204 in accordance with an aspect of the present invention. The weighting designator component 210 can randomly assign characteristics based on weightings (e.g. statistical parameters such as weighted averages of desired user profiles) to users that shape the load to the server. Such random assignments based on weightings for various profile characteristics can create a diverse profile during a load testing of the server 204. Typically, a load test session can consist of various such user profile mixes that can access and stress a server at a particular rate. Such rate can be adjusted via a controller 212 that can control the number of users, and thus the rate of requests loaded on to the server 204, (e.g. request per second (RPS)). For example, the controller 212 can plan capacity of stress loading, and increase the per iteration requests per second to a predetermined level, (e.g., 100 requests to 200 requests per second). A performance monitor component 214, (e.g., a performance counter) can be provided and configured with a plurality of related system metrics, such as providing statistics on CPU bandwidth of the server 204 and memory availability, for example. By monitoring performance of the server 204 as the rate of requests are increased, load capacity for the server 204 can be determined. Alternatively, the requests per second can be increased until it is determined that the server 204 can no longer respond to the additional load, (e.g., additional requests no longer serviced). In this manner, capacity can be determined as the maximum number of requests per second which can be serviced.

By employing such controller 212 that controls the number of users, and thus request per seconds (RPS), test administrators can place a controllable amount of stress on a given application and/or piece of code. This can also be advantageous in determining whether the application can service the desired load. For example, by providing a sustained rate of requests, variability relating to inconsistent load generation can be mitigated—If number of requests sent to the server is inconsistent, it can be difficult to determine if stress indicators on the server 204 are due to server performance or due to spikes generated by inconsistent load requests. As such, test administrators can monitor counters on the server to determine application performance without variability introduced from the load. Moreover, by increasing the RPS via the controller 212, test administrators can efficiently and accurately increase the rate of requests over time—in a controlled manner, to determine where an application or server begins to break down thus, reducing the quality of the server 204. By monitoring metrics such as performance counters described above, test administrators can also make predictions on additional capacity requirements—if any. For example, a test administrator can adjust the RPS via the controller 212 to be at about 100 which can approximate an actual network load. A new application can be required to run on the server 204 wherein the expected rate of requests can increase to 120, for example. By adjusting the RPS to 120, the administrator can predict whether or not the new application can service the increased rate. In this manner, administrators can determine whether additional hardware and/or performance may be necessary at the server 204 to service the desired load.

As explained supra, the dynamic load adjustor component 206 can adjust the user population with a per iteration model, such that a diverse user population can be created via a single user profile with predetermined weightings assigned to various characteristics—such as type of: connection, browser, script and the like—as described in more detail infra. The iteration can be a single pass of a user through a web site or set of instructions on a server.

For example, an administrator for a web site wishes to test it under load. The website can consist of a catalog and a shopping cart. A user can access the web site and select items from a page with such items added to the shopping cart, and modifying the various variables that define the elements of the cart, such as item ID, quantity and price. The user can navigate to other web pages of the site containing information on additional items for sale. Once the user is finished with their purchases, the final shopping cart information can be sent along with the user's other necessary identification information to the shopping site's server, which processes the order. Typically, it is desirable for the administrator to be able to simulate a wide variety of users, some percentage of them buying products, while another percentage merely browsing various pages associated with the website. Such variable mix of users can generally incorporate a plurality of browser types, connection means, hardware or software configuration, and the like. In addition, some users can represent sales people of the website who access such web site via specific connection paths, which can further constitute an additional characteristic of the user profile.

Figure 3:
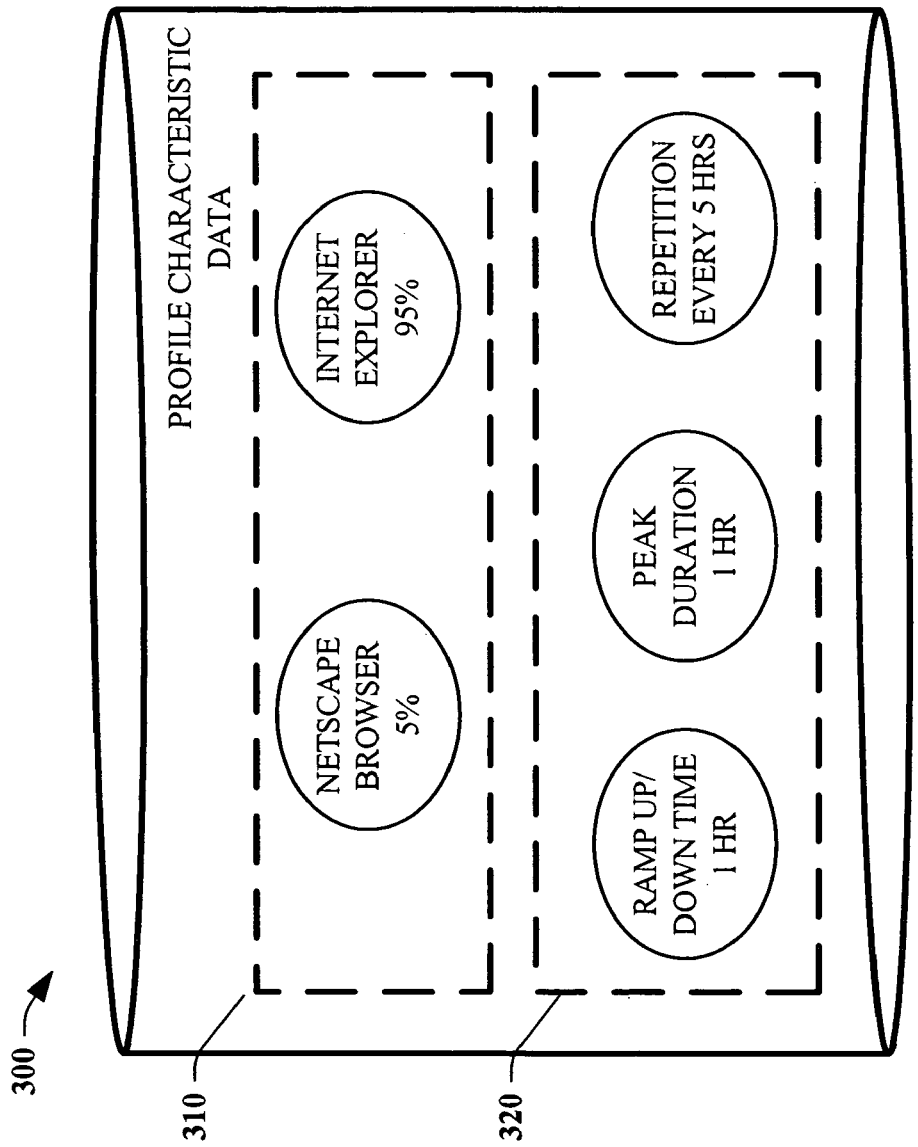
FIG. 3 illustrates a particular process profile characteristic and mix for stressing the server.
Figure 4:
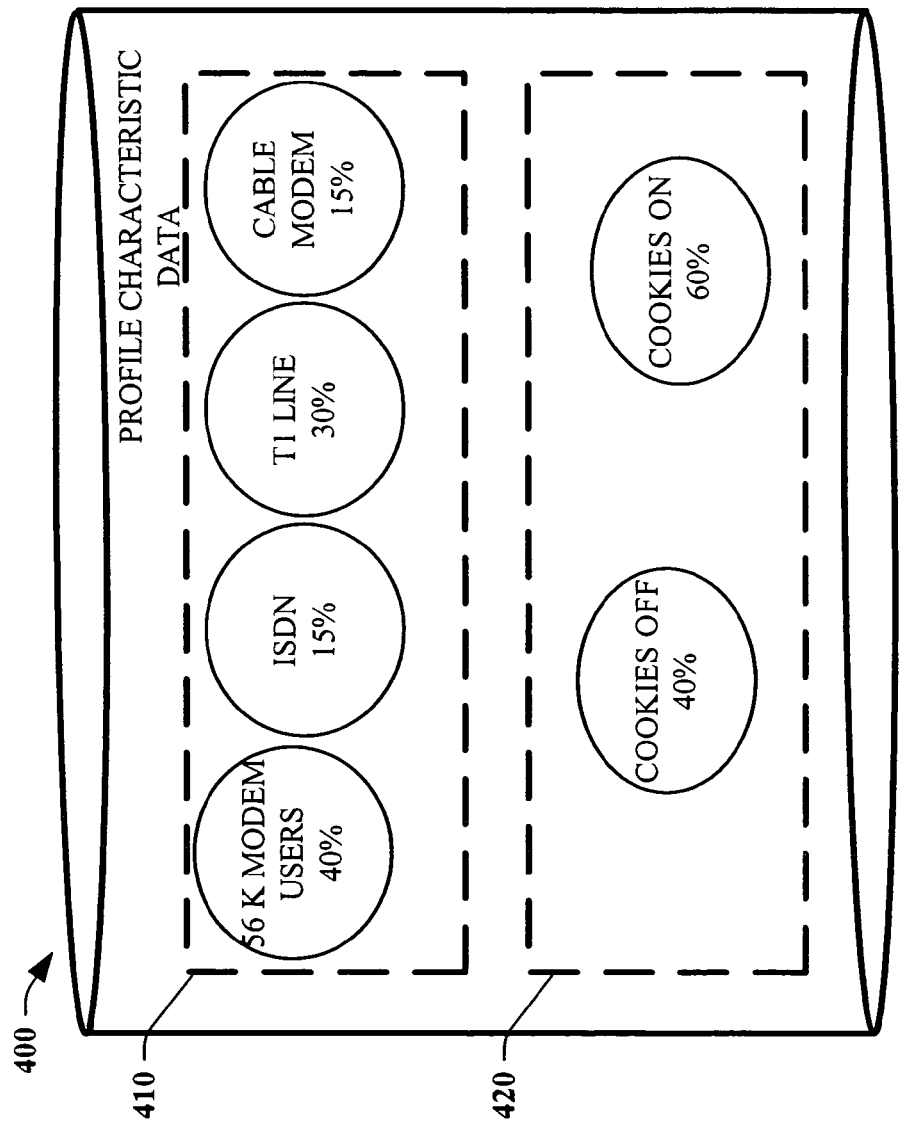
FIG. 4 illustrates another exemplary process profile characteristic and mix for stressing the server.

FIG. 3 and FIG. 4 illustrate various exemplary process profile characteristic and mixes for stressing the server, with profile characteristics 300, 400 that further include a browser profile 310 with associated weightings, a load testing pattern profile scheme 320, a network band width mix 410 and cookies selection profile 420. Typically, it is to be appreciated that such profiles are for particular test load and the invention is not so limited. Moreover, various other characteristics (e.g. IP switching features, different scripts, maximum or minimum number of users and the like) can also be considered as part of a test profile. Accordingly, a single user profile with weightings assigned to various characteristics can be specified, with the weightings being employed to dynamically determine what the user mix will be to the server based on a per iteration model. At any given time during the load test, a predetermined number of simulated users can run according to various settings of such user profile. As a user completes an iteration (e.g., enters and leaves a website of a server), a new user is introduced to the server and is randomly assigned user characteristics according to the weightings specified in the profile. Such a per iteration model mitigates a need to define various permutations of users upfront, and employing a conventional per thread model. For example, in accordance with an aspect of the present invention, a test administrator can specify that at any given time during the test run, one hundred users should be loading the server. Of such one hundred users, five users can employ a Netscape browser and remaining ninety-five users can employ internet explorer. As one user exits the web page, another user can be randomly assigned a browser type based on the 5% Netscape and 95% internet explorer model. Thus, as the number of iterations increases, an outcome of the test will statistically average out to have been performed according to the specified weightings for the browser type in the user profile.

Figure 5:
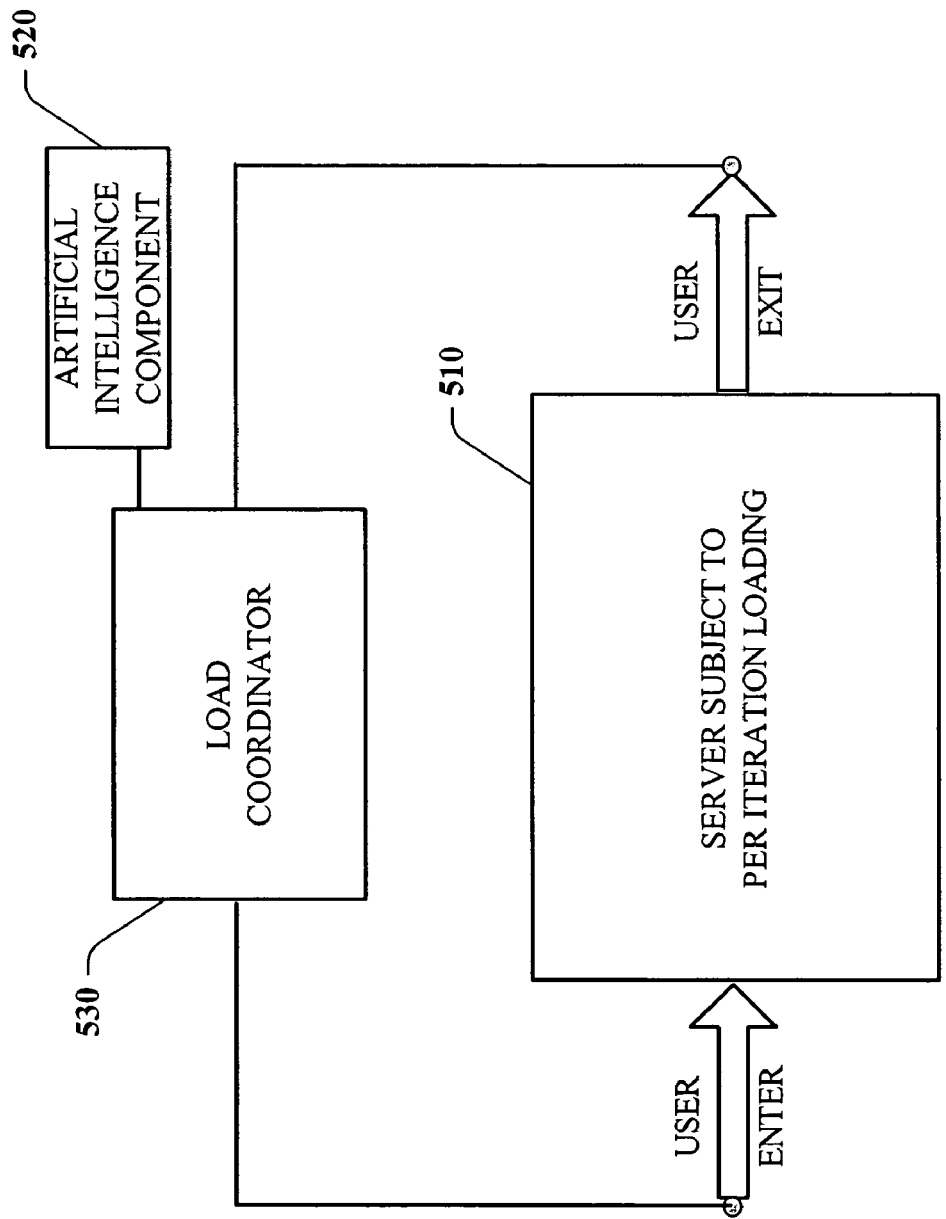
FIG. 5 illustrates a schematic block diagram of a load coordinator as part of the loading system according to one aspect of the present invention.

FIG. 5 illustrates a schematic block diagram of a load coordinator as part of the loading system according to one aspect of the present invention. The load coordinator component 530 can evaluate a current distribution of simulated users entering and leaving the server 510 relative to a desired test load and adjust the intensity of the load test (e.g. number of users directed to the server per unit of time), as well as the distribution of the users. Once an iteration is complete, for example a user enters and leaves a web site hosted on the server 510, the load coordinator component 530 can simulate another user arriving. As the number of iterations increases, and even though the characteristics are chosen randomly, the mix of load can statistically reach the weightings specified, as explained supra. Thus, a diverse mix can be produced based on a single user profile with weighted characteristics. In addition, the subject invention can employ various artificial intelligence (AI) based schemes for carrying out various aspects thereof. For example, a process for learning explicitly or implicitly when and to what extent the server 510 should be loaded can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

Load simulation scenarios facilitated by the AI component 520 can include a plurality of test mixes, load profiles and user profiles that can be statistically determined based on records of web logs or inferences made by the AI component 520. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
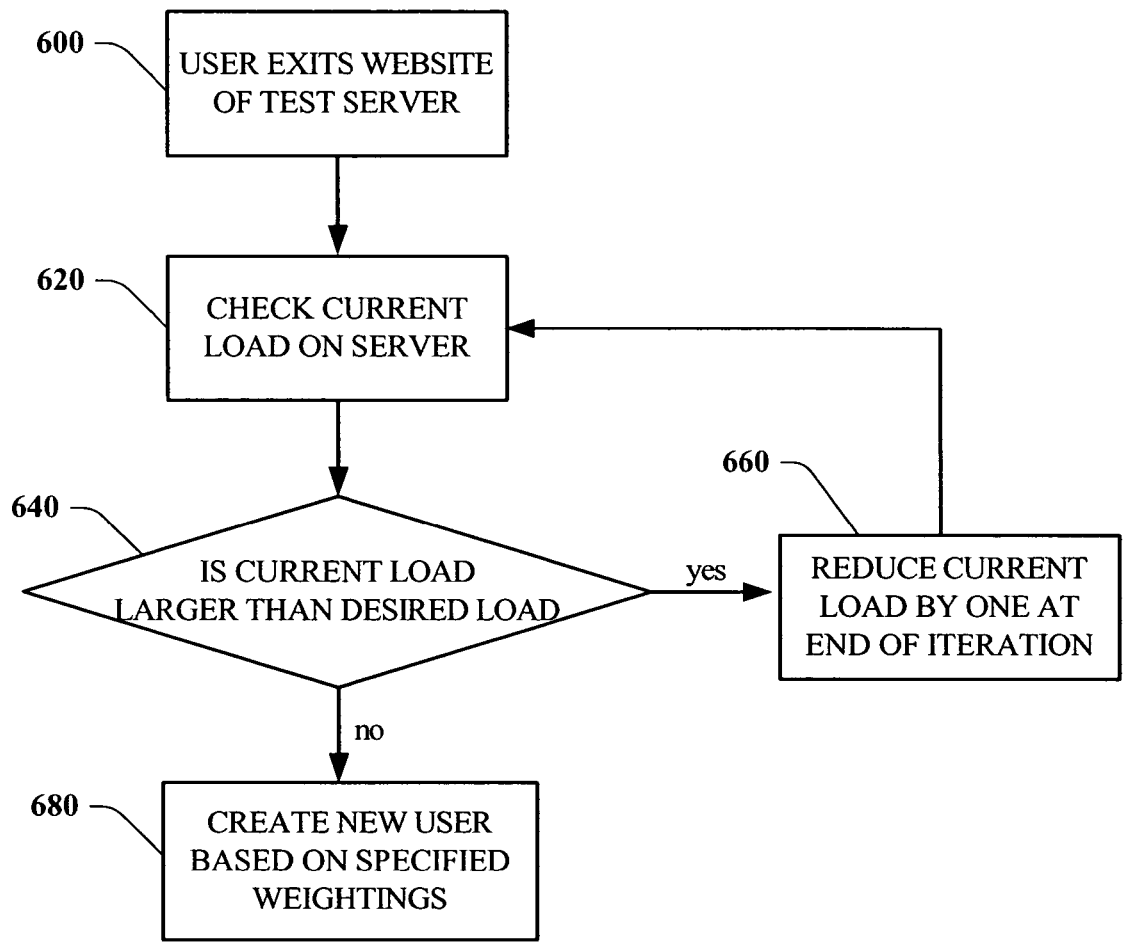
FIG. 6 illustrates a methodology according to one aspect of the present invention.

FIG. 6 illustrates a methodology according to one aspect of the present invention. At 600 a user exits the web site that is hosted on the server that is subject to the load stress. At 620 an execution engine that simulates loads to the server checks the current load that the server is subjected to. Next, a comparison is made at 640 between the current load and the desired load. Such comparison can be made periodically, or at predetermined times as defined by test administrators. If the desired load is greater than the current load then at 680 a new user is created based in part upon the weightings specified for user's various characteristics (e.g. browser type, network connection and the like). If on the other hand the desired load is equal or less than the current load no user is created, and upon completion of the next iteration the current load is reduced by one at 660. Accordingly, a diverse user population can be simulated that is dynamically adjusted based on the weightings assigned in the user profile. Such methodology can facilitate a distribution of simulated user characteristics as a percentage of total requests, (e.g. a per iteration model), as opposed to as a percentage of total users (e.g. thread per user model).

In a related aspect of the present invention a "think time" variable can be introduced as part of the user profile that can typically designate a time a user will take between requests. The think time can typically imitate a wait period between actions of a user accessing a web page on a web server, and can be chosen based on statistical analysis of web log records. For example, upon reaching a home page of a web site to be tested, the user can delay two seconds before visiting a product search page associated with the web site. The user can then spend five seconds to fill out the search form. Such think time can typically be set to predetermined values for various pages on the web site, and facilitate simulation of periods the user takes between issuing requests.

Figure 7:
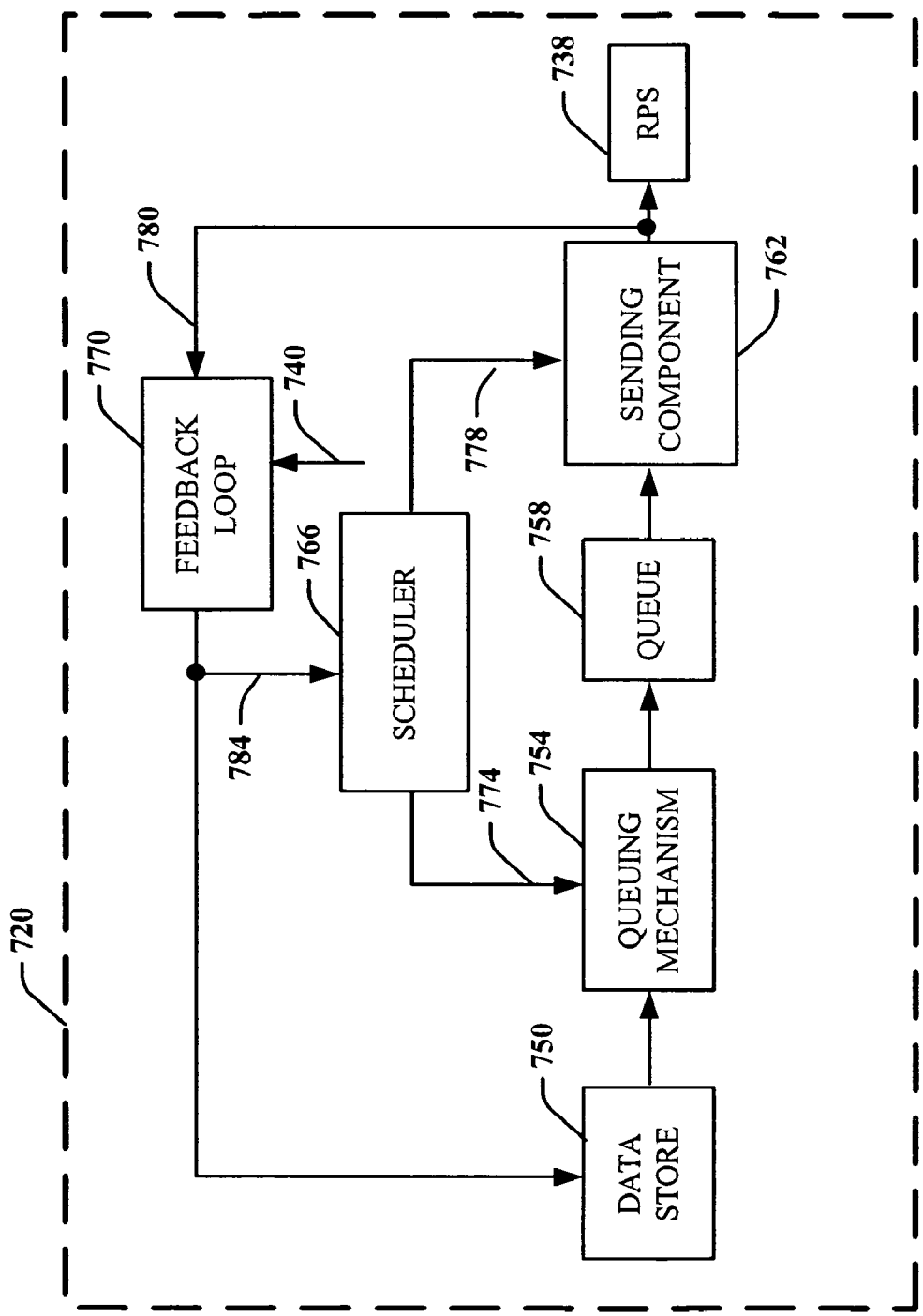
FIG. 7 illustrates a particular architecture for a loading system that employs a per iteration model in accordance with an aspect of the present invention.

Referring now to FIG. 7, a block diagram that illustrates an architecture for a continual rate generator 720, which can be part of an execution engine employing a per iteration model in accordance with an aspect of the present invention. The system 720 can provide an adjustable RPS 738 as described above wherein stress testing, failure predictions and capacity planning can be determined. The system 720 can include a data store 750 with assigned weightings for various characteristics, a queuing mechanism 754, a queue 758, a sending component 762 for sending requests based on a per iteration methodology as described supra, a scheduler 766 and a feed back loop 770. The data store 750 can also include data in the form of HTTP requests to be sent to server based on the weighting characteristics. As described supra, other data formats can be included within the data store 750.

The queuing mechanism 754 can retrieve data from the data store 750 based upon a signal input 774 from the scheduler 766. The queuing mechanism 754 can be implemented via a standard queuing algorithm, for example. HTTP requests from users randomly picked based on the weighting scheme can be placed into the queue 758 by the queuing mechanism 754 when the scheduler enables the input 774. Sorting requests within the queue 758 can be provided by the queuing mechanism 754 according to a predetermined time function for execution, for example. Based upon a send input 778 from the scheduler 766, the sending component 762 reads the sorted requests from the queue 758 and sends the requests based upon a rate determined by the scheduler 766. In this manner, the desired RPS 738 can be provided.

The feedback loop 770 provides closed loop control to enable the system 720 to provide a continual and sustained rate of requests 738. A target RPS input 740, as described above, can be provided to the feedback loop 770 along with an actual RPS input 780. By subtracting the actual RPS from the target RPS or vice versa, the feedback loop 770 can provide an error input 784 to the scheduler 766 and/or the data store 750 in order to control the RPS 738. Based upon the error input 784, the scheduler or the data store 750 can attempt to increase and/or decrease the RPS 738 to adjust the rate via inputs 774 and 778 according to the target RPS 740. According to one aspect of the present invention, the system 720 described above can be provided within a client computer system (not shown). The system 720 can employ various performance counter sets (not shown), which can also be defined by test administrators. It is to be appreciated that all or some of the system 720 portions can be executed within one or more threads, executables, and/or objects, for example.

The following exemplary parameters or code fragment describes portions of the system 720 illustrated in FIG. 7. It is to be appreciated that other programming languages (e.g., visual basic, JAVA, assembler, etc.) and/or steps can be employed to provide the above-described portions of the system 720.

| Parameter | Description |
| --- | --- |
| Description | Description of the run |
| Duration | How long to run the test for. This can be specified as time, #iterations, or as once per data row. |
| Warm-up | Time to allow test to warm up before collecting statistics. |
| Rig | The rig to run on. |
| Agents to run on | Options are: a specific set of agents, all agents, or n agents. |
| Counter set map | Specifies which machines to collect perf counters on. |
| Validation level | Validation level for validation rules. Simple filter to prevent firing expensive rules. Ties to the Level property on a validation rule. |
| Context parameter names and values | Extracts the test-rig-specific parameters in the Test Case definitons and allows the user to map these to values appropriate for the test rig. An example of a test context parameter is the target web site server name. |
| Sample rate | Rate at which data is persisted |
| Refresh rate | Rate at which UI is updated |
| Request timeout threshold | How long to wait for a request before giving up on it. Need to delete this prop on Requests in Web Test Editor. |
| Max Load override | Sets validation level to low, think times to off, logging off, results level to Minimum. |

Figure 8:
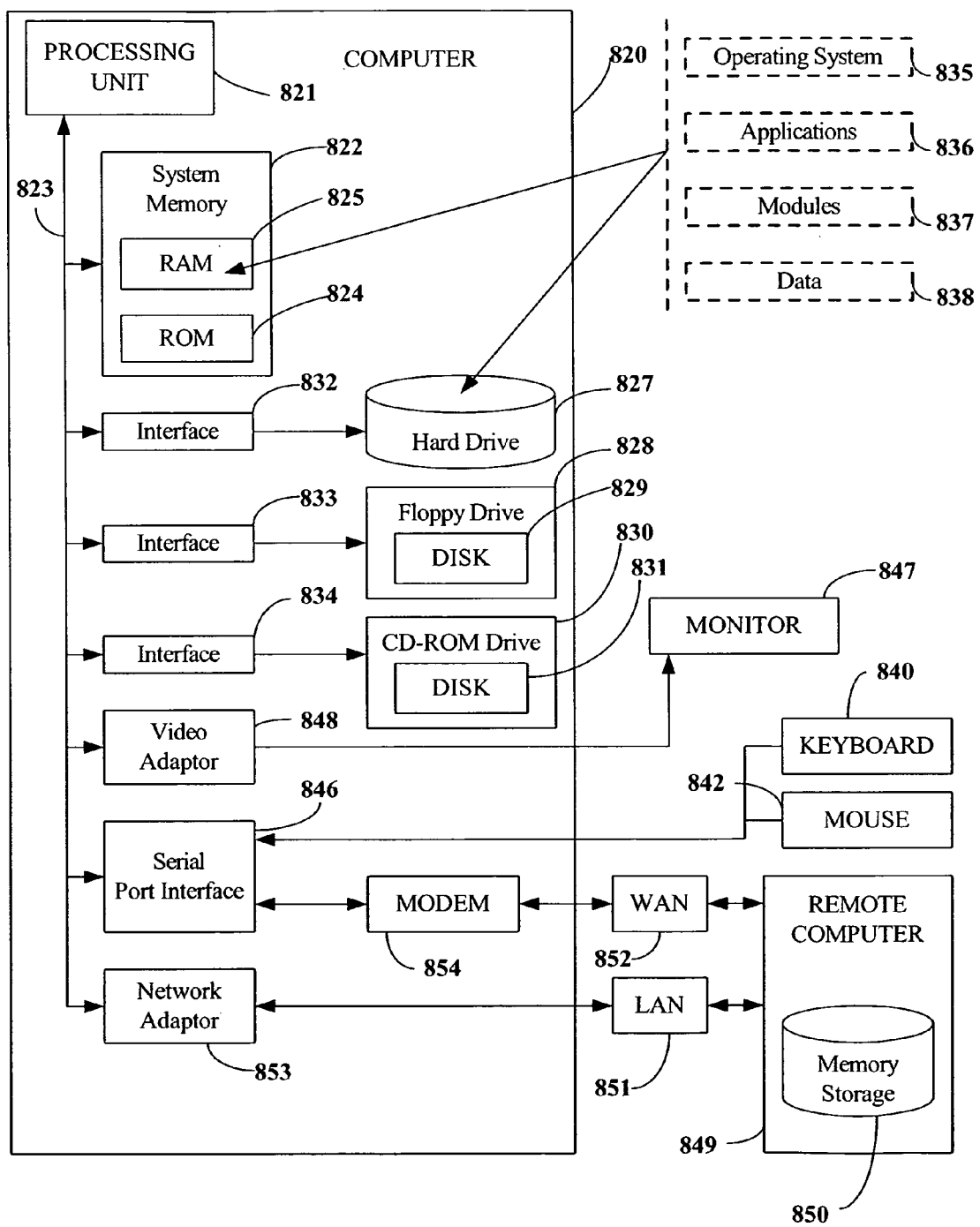
FIG. 8 is a schematic block diagram illustrating a suitable computing environment in accordance with an aspect of the present invention.

Referring now to FIG. 8, a brief, general description of a suitable computing environment on the simulated user or client as well as on the server side is illustrated wherein the various aspects of the present invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary includes a computer 820, including a processing unit 821, a system memory 822, and a system bus 823 that couples various system components including the system memory to the processing unit 821. The processing unit 821 can be any of various commercially available processors. Dual microprocessors and other multi-processor architectures also can be used as the processing unit 821.

The system bus can be any of several types of bus structure including a memory bus or memory controller, a peripheral bus, and a local bus using any of a variety of commercially available bus architectures. The system memory can include read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading from or writing to a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media can contain computer-executable instructions for performing the methods of the present invention.

A number of program modules can be stored in the drives and RAM 825, including an operating system 835, one or more application programs 836, other program modules 837, and program data 838. The operating system 835 in the illustrated computer can be substantially any commercially available operating system.

A user can enter commands and information into the computer 820 through a keyboard 840 and a pointing device, such as a mouse 842. Other input devices (not shown) can include a microphone, a joystick, a game pad, a satellite dish, a scanner, or the like. These and other input devices are often connected to the processing unit 821 through a serial port interface 846 that is coupled to the system bus, but can be connected by other interfaces, such as a parallel port, a game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 can operate in a networked environment using logical connections to one or more remote computers, such as a remote computer 849. The remote computer 849 can be a workstation, a server computer, a router, a peer device or other common network node, and typically includes many or all of the elements described relative to the computer 820, although only a memory storage device 850 is illustrated in FIG. 8. The logical connections depicted in FIG. 8 can include a local area network (LAN) 851 and a wide area network (WAN) 852. Such networking environments are commonplace in offices, enterprise-wide computer networks, Intranets and the Internet.

When employed in a LAN networking environment, the computer 820 can be connected to the local network 851 through a network interface or adapter 853. When utilized in a WAN networking environment, the computer 820 generally can include a modem 854, and/or is connected to a communications server on the LAN, and/or has other means for establishing communications over the wide area network 852, such as the Internet. The modem 854, which can be internal or external, can be connected to the system bus 823 via the serial port interface 846. In a networked environment, program modules depicted relative to the computer 820, or portions thereof, can be stored in the remote memory storage device. It will be appreciated that the network connections shown are exemplary and other means of establishing a communications link between the computers can be employed.

In accordance with the practices of persons skilled in the art of computer programming, the present invention has been described with reference to acts and symbolic representations of operations that are performed by a computer, such as the computer 820, unless otherwise indicated. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations wherein such data bits are maintained are physical locations that have particular electrical, magnetic, or optical properties corresponding to the data bits.

Figure 9:
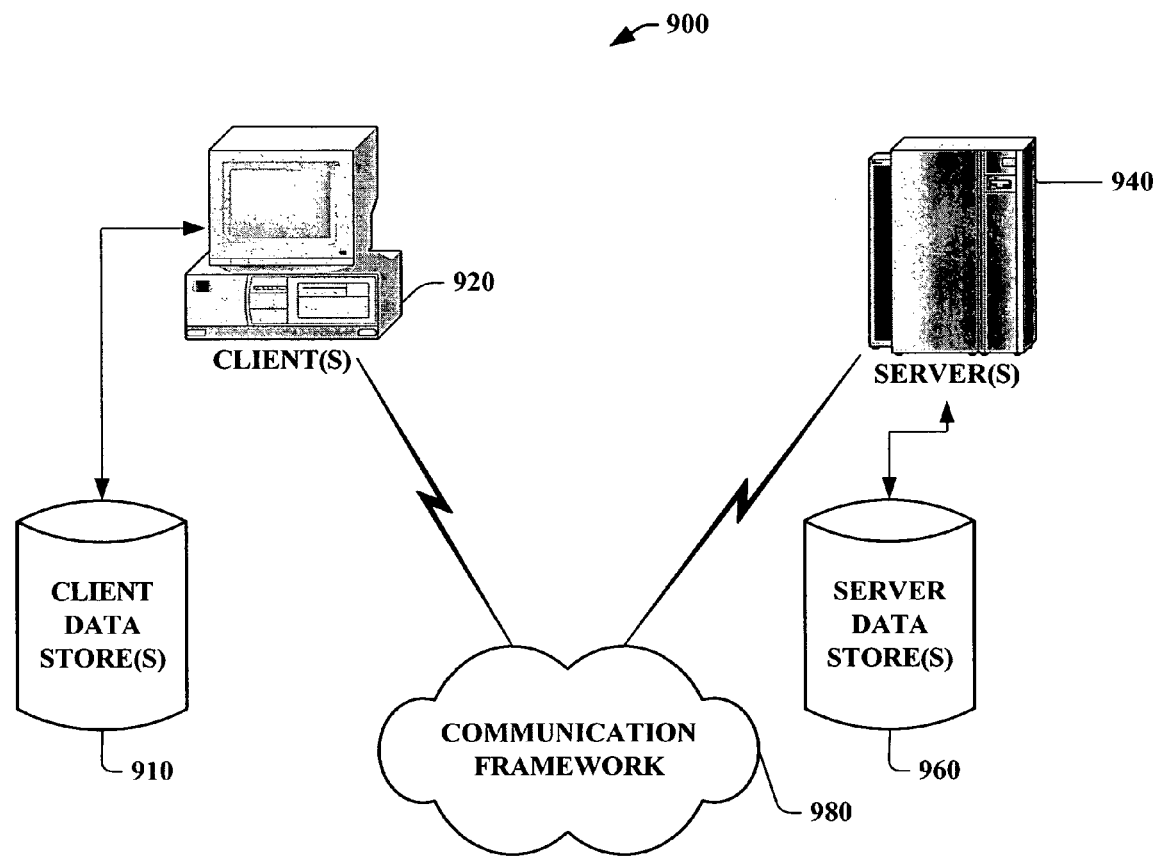
FIG. 9 illustrates a client-server loading system that employs a per iteration loading methodology according to one aspect of the present invention.

Referring now to FIG. 9, a client-server system 900 that employs a dynamic per iteration loading according to one aspect of the present invention is illustrated. The user or client(s) 920 can be hardware and/or software (e.g., threads, processes, computing devices). The system 900 also includes one or more server(s) 940. The server(s) 940 can also be hardware and/or software (e.g., threads, processes, computing devices). For example, such servers 940 can house threads to perform transformations by employing the present invention. The client 920 and the server 940 can communicate, in the form of data packets transmitted according to the present invention, between two or more computer processes. As illustrated, the system 900 includes a communication framework 980 that can facilitate communications between the client(s) 920 and the server(s) 940. The client(s) 920 is operationally connected to one or more client data store(s) 910 that can store information local to the client(s) 920. Moreover, client 920 can access and update databases 960 located on a server computer 940 running a server process. In one aspect of the present invention, the communication framework 980 can be the internet, with the client process being a Web browser and the server process being a Web server. As such, a typical client 920 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 940 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising.".

What is claimed is:

1. A computer-implemented system configured to place a controllable amount of stress on a server that is running an application in order to test load the server by dynamically randomly generating, on a per iteration basis, each request of a test load based on a predefined set of weighted user characteristics such that the percentages of user characteristics of the totality of the requests statistically corresponds to the weighted percentages in the user characteristics, in order to simulate a diverse population of users accessing the application without using upfront determination of user characteristics for simulated users, the system comprising:
   a processor; and
   memory storing the following:
   a profile characteristic data store comprising the predefined set of weighted user characteristics;
   one or more load simulators, interfaced to the profile characteristic data store, each having a dynamic load adjuster component that, for each iteration of the test load, dynamically randomly generates user characteristics for a request based on percentage weightings in the predefined set of weighted user characteristics, wherein the percentage weightings statistically designate distribution of user characteristics as a percentage of total requests sent to the server such that whereas each request is individually generated randomly, as the number of iterations increases, the load simulator generates a totality of requests that statistically corresponds to the weightings in the profile characteristic data store,
   a load coordinator component that dynamically evaluates the current distribution of the test load relative to a desired test load and adjusts the intensity and distribution of the requests, including increasing the requests per second to a predetermined level; and
   a performance monitor component that monitors performance of the server as the rate of requests is increased, so the load capacity of the server can be determined.

2. The system of claim 1, the predefined set of user characteristics comprising at least one of: network connections, browser types, and load patterns.

3. The system of claim 1, wherein the predefined set of user characterstics are statistically determined based on web log records.

4. The system of claim 1, wherein the predefined set of user characteristics are predetermined in a single user profile.

5. The system of claim 1, further comprising an artificial intelligence component.

6. The system of claim 1, further comprising a closed loop control to enable a continual and sustained rate of requests to the server.

7. The system of claim 1, wherein the one or more load simulators comprise a plurality of load simulators.

8. A computer-implemented method for load testing a server, whereby a controllable amount of stress may be placed on the server via an application running on the server, the method comprising:
   assigning weights to user characteristics in a user profile;
   dynamically randomly generating, for each iteration of a plurality of iterations in a test load, a request according to percentage weightings in the weighted user characteristics, wherein the percentage weightings are statistical parameters that designated distribution of user characteristics as a percentage of total requests, such that whereas each request is generated randomly, as the number of iterations increases, the load simulator generates a totality of requests with user characteristics that statistically corresponds to the weightings in the profile characteristic data store;

dynamically evaluating, upon ending the iteration of the test load, the current test load relative to a desired test load and adjusting the intensity and distribution of the requests, including one of either creating a new request if the desired load is greater than the current load, or reducing the current test load by one if the current load rises above the desired load.

9. The method of claim 8, further comprising controlling a rate of loading via a feedback loop control.

10. The computer-implemented method of claim 8, wherein the user characteristics are stored in no more than a single user profile.

11. A machine-implemented system that dynamically stresses a server by providing an adjustable rate of requests per second (RPS) to conduct stress testing, failure predictions, and capacity planning, the system comprising:

an execution engine that generates a scenario that loads the server via a plurality of requests, the plurality of requests dynamically adjusted based on a user profile having weighted characteristics that comprises at least a browser type therein, wherein user characteristics are distributed as a percentage of total requests, and wherein the execution engine comprises a data store containing the user profile, including the weighted user characteristics;

a scheduler;

a queuing mechanism that retrieves data from the data store based on a received signal input from the scheduler and places the request data in a queue and sorts requests within the queue according to a predetermined time function for execution, wherein the retrieved request data is randomly selected based on the weighted user characteristics;

a sending component that reads and sends a sorted request from the queue upon receiving an input from the scheduler based upon a rate determined by the scheduler in order to provide a desired RPS;

a feedback loop which provides closed loop control to enable the system to provide a continual and sustained rate of requests, wherein the feedback loop provides an input to the scheduler that is calculated based on the difference between an actual RPS and a target RPS, wherein the scheduler, based on the input, adjusts the rate of requests according to the target RPS.

* * * * *